United States Patent [19]

Durrell et al.

[11] 3,864,104

[45] Feb. 4, 1975

[54] PROCESSES FOR THE PREPARATION OF CHLOROIMINOPHOSGENE

[75] Inventors: William S. Durrell, Chappaqua, N.Y.; Robert J. Eckert, Jr., Mobile, Ala.

[73] Assignee: Ciba-Geigy Corporation, Ardsley, N.Y.

[22] Filed: Oct. 5, 1973

[21] Appl. No.: 403,742

Related U.S. Application Data

[60] Division of Ser. No. 256,690, May 25, 1972, Pat. No. 3,801,483, which is a continuation-in-part of Ser. No. 862,519, Sept. 30, 1969, abandoned.

[52] U.S. Cl. .................................. 55/71, 423/383
[51] Int. Cl. ........................................... B01d 53/14
[58] Field of Search ........ 55/48, 51, 71, 84; 203/42; 204/157.1 R; 423/383

[56] References Cited
UNITED STATES PATENTS
3,618,295  11/1971  Geiger et al. ........................ 55/71

*Primary Examiner*—Charles N. Hart

[57] ABSTRACT

Chloroiminophosgene, useful as a fungistat, bleaching agent and chemical intermediate, is produced by a procedure involving the reaction of cyanogen chloride with chlorine in the presence of radiation. Chloroiminophosgene is also prepared by a method involving its concentration in and isolation from cyanogen chloride gas streams.

1 Claim, No Drawings

PROCESSES FOR THE PREPARATION OF CHLOROIMINOPHOSGENE

CROSS-REFERENCE TO RELATED APPLICATION

This is a divisional of application Ser. No. 256,690, filed on May 25, 1972 and now U.S. Pat. No. 3,801,483 which is a continuation-in-part of copending application, Ser. No. 862,519, filed Sept. 30, 1969 and now abandoned.

DETAILED DESCRIPTION OF THE INVENTION

The present invention relates to processes for the preparation of chloroiminophosgene or N-chloroisocyananide dichloride of the formula

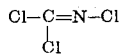

More particularly, this invention pertains to a procedure for the production of chloroiminophosgene by reacting cyanogen chloride and chlorine in the presence of radiation as well as to a procedure for its production by concentrating it in and subsequently isolating it from cyanogen chloride process gas streams.

The cyanogen chloride/chlorine reaction is illustrated by the following equation:

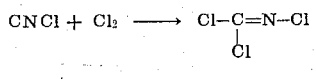

This reaction is conducted in the presence of liquid chlorine, an excess of liquid cyanogen chloride with or without an inert completely halogenated compound such as carbon tetrachloride, tetrachloroethylene, hexachloroethane and the like. Irradiation is utilized in this reaction, as for example, exposure to sunlight or use of U.V. radiation.

Generally, the reaction is conducted under substantially anhydrous conditions and in the absence of reactive metals. Water and metals such as iron, sulfate, chloride ions and the like, cause trimerization of cyanogen chloride to cyanuric chloride.

The reaction temperature can range between about 15° and 50°C or lower depending upon the melting point of the solvent used. A suitable temperature in the case when cyanogen chloride is used as the solvent is not in excess of about 20°C. Generally, when lower temperatures are used, the half-life of the resulting iminophosgene is longer.

An alternate mode of synthesis is the following. A gaseous mixture of cyanogen chloride and chlorine is continuously fed into a glass tubular reactor which is irradiated with ultraviolet light and the temperature is maintained in the reactor above the temperature at which the chloroiminophosgene liquifies. The chloroiminophosgene is recovered by either conventional absorption or distillation techniques.

The following Examples are illustrative of the use of radiation in the present invention and are therefore not to be considered as limitative in scope. Unless otherwise indicated, the temperatures are given in degrees Centigrade.

Example I

Ten grams of liquid cyanogen chloride were saturated with chlorine at 0°–5°C. About 7.0 mole % $Cl_2$ relative to CNCl was observed by gas chromatographic analysis (Attachment II, B). After transferring the mixture to and sealing in a glass ampoule followed by exposure of the green mixture to sunlight for 15–20 hours, the chlorine color disappeared. After cooling the tube to 0°C, removing and subjecting a sample to gas chromatography (Attachment IIA, B) there was less than 0.05% (mole) chlorine and 7.7% (mole) $Cl_2CNCl$ corresponding to 14.7% by weight. An active chlorine determination using isopropanol solvent and $KI/Na_2S_2O_3$ titration revealed a 8.5% (wgt.) active chlorine, corresponding to 15.8% (wgt.) $Cl_2CNCl$ assuming the structure $Cl_2CNCl$ and CNCl, $Cl_2$ and $Cl_2CNCl$ to have the same gas chromatographic response factors. Results of mass spectral analysis showing ion fragments at nominal masses 131, 133 and 135 and strong infra-red absorbances at $6.4\mu$ and $10.4\mu$ (and a minor absorbance at $13.4\mu$) support the proposed structure.

Stability studies indicate that the material has an estimated half-life of approximately 40 hours at 40°C in white light. Based on the retention time on a boiling point gas chromatographic column, the material has a boiling point of 83° at 760 mm. It can be purified by a reduced pressure distillation procedure.

Example II

This run was designed to generate sufficient material for distillation purposes. Approximately 200 g of liquid cyanogen chloride was saturated with chlorine at −5°C to −25°C and the green liquid transferred to and sealed in three glass ampoules with a fine oxygen flame. The tubes were allowed to warm to ambient temperature and placed in front of a 1,200 watt mercury vapor lamp for 30 minutes, during which time the chlorine color had essentially disappeared.

The ampoules were then frozen and the seal broken. The CNCl mixture was allowed to melt and then transferred to a distillation flask protected by a safety shield. After removing cyanogen chloride by refluxing, a crude fraction (94 g) bp. 74°–82°C/760 mm was isolated using a 1 ft. × 1 in. glass Vigreaux column. This material was redistilled the following day using a 1 ft. × 1 in. packed glass column and the material redistilled under reduced pressure. After refluxing to remove CNCl and $Cl_2$, a total of 70 g. of $Cl_2CNCl$ material were collected in the following fractions:

```
Fraction  I:  62°C/340 mm (1 g)
Fraction II:  61–62°C/340 mm (15 g)
Fraction III: 62–62.5°C/340 mm (55.0 g).
```

Residue 1 g (probably cyanuric chloride). Fraction II was shown by gas chromatography (area percent) to be: 87.8% $Cl_2CNCl$, 11.1% $CCl_4$ and less than 1.0% $CNCl/Cl_2$. Fraction III was shown by gas chromatography to be: 96.3% $Cl_2CNCl$, 3.2% $CCl_4$ and less than 0.5% $CNCl/Cl_2$.

As mentioned above chloroiminophosgene can also be produced by concentrating it in and isolating it from a gas stream consisting of cyanogen chloride, chlorine and chloroiminophosgene. Chloroiminophosgene is co-produced in small amounts, e.g., up to 1% in the production of cyanogen chloride from hydrocyanic acid and chlorine e.g., in processes for the production of cyanogen chloride as illustrated in U.S. Pat. Nos. 3,197,273 and 3,567,406. According to this mode of chloroiminophosgene production, the gas stream is absorbed in an inert organic solvent, preferably carbon tetrachloride (since chloroiminophosgene apparently chlorinates slowly to give carbon tetrachloride) or hexachloroethane. This solution is fed to a stripping column where the low boiling cyanogen chloride and chlorine are removed and recycled back to the reactor. The chloroiminophosgene/carbon tetrachloride solution is fed to a second column where the solvent is removed continuously overhead and recycled back to the primary absorber or to storage. The higher boiling chloroiminophosgene (bp 83°C) is removed from the bottom of the column (if a higher boiling solvent, e.g., hexachloroethane is employed the product is removed overhead.) Reduced pressure in all distillations may be employed to minimize chloroiminophosgene decomposition to carbon tetrachloride or cyanuric chloride.

Chloroiminophosgene is useful as a fungistatic agent, as a bleaching agent for paper or fabrics and as an intermediate for the production of organic isocyanates which are utilized in turn in resin synthesis.

We claim:

1. A process for concentrating and isolating chloroiminophosgene contained in cyanogen chloride gas streams as co-produced by-product which comprises absorbing said gas stream in an inert organic solvent, stripping the cyanogen chloride from the solution obtained, and separating the solvent from the chloroiminophosgene solution by distillation.

* * * * *